(12) United States Patent
Chu et al.

(10) Patent No.: US 8,100,422 B1
(45) Date of Patent: Jan. 24, 2012

(54) CENTRAL TRANSMISSION DEVICE FOR A FOUR-WHEEL STEERING SYSTEM

(75) Inventors: Chia-Chun Chu, Tainan (TW);
Deng-Maw Lu, Tainan (TW);
Chau-Chin Chang, Tainan (TW)

(73) Assignee: Southern Taiwan University,
Yung-Kang, Tainan (TW)

( * ) Notice: Subject to any disclaimer, the term of this patent is extended or adjusted under 35 U.S.C. 154(b) by 0 days.

(21) Appl. No.: 12/888,074

(22) Filed: Sep. 22, 2010

(51) Int. Cl.
*B62D 7/14* (2006.01)
(52) U.S. Cl. .................................... 280/91.1
(58) Field of Classification Search ............... 280/91.1
See application file for complete search history.

(56) References Cited

U.S. PATENT DOCUMENTS

| | | | | | |
|---|---|---|---|---|---|
| 4,950,126 | A | * | 8/1990 | Fabiano et al. | 414/590 |
| 5,341,294 | A | * | 8/1994 | Kanazawa et al. | 701/41 |

* cited by examiner

*Primary Examiner* — Eric Culbreth
(74) *Attorney, Agent, or Firm* — Birch, Stewart, Kolasch & Birch, LLP

(57) ABSTRACT

In a central transmission device of a four-wheel steering system, a turning output unit includes an output shaft extending rotatably through a rear wall of a housing for connection with a rear wheel turning mechanism, and a rotary disc coaxial and integral with a front end of the output shaft. The rotary disc has a radially extending slide groove. A turning input unit includes an input shaft extending rotatably through a front wall of the housing for connection with a front wheel turning mechanism, and a cam protrusion disposed eccentrically at a rear end of the input shaft. The cam protrusion extends into the slide groove and drives the rotary disc. The rotary disc turns reciprocally within a limited angle when the cam protrusion rotates one revolution.

6 Claims, 7 Drawing Sheets

CENTRAL TRANSMISSION DEVICE FOR A FOUR-WHEEL STEERING SYSTEM

BACKGROUND OF THE INVENTION

1. Field of the Invention

The invention relates to a central transmission device of a four-wheel steering system, and more particularly to a mechanical type central transmission device for a four-wheel steering system.

2. Description of the Related Art

The concept of four-wheel steering (abbreviated as 4WS) has long been applied to the structures of the farming vehicles such as tractors, mowers, harvesters, etc., to facilitate movements in narrow, muddy and uneven farmland and country roads. The concept of four-wheel steering is also applied to passenger vehicles. When a 4WS vehicle is driven at a low speed, or steered to turn by a large angle, the front and rear wheels are turned in opposite directions to reduce the turning radius and to increase the vehicle's agility for roadside parking and turning. When the vehicle is driven at high speed or steered to turn by a small angle, the front and rear wheels are turned in the same direction to reduce lateral swinging of the vehicle body and to increase stability when changing driving lanes and driving at high speed.

Generally speaking, a four-wheel steering system primarily includes a front wheel turning mechanism, a rear wheel turning mechanism and a central transmission device connecting the front wheel turning mechanism and the rear wheel turning mechanism. The central transmission device includes a mechanical type and an electronic type. Since the mechanical-type central transmission device has better durability, better stability, and impact resistance, and is less susceptible to damage from ambient environmental conditions, the mechanical type central transmission device is relatively popular in research and development.

A mechanical type central transmission device can receive an angular displacement input from the front wheel turning mechanism and transmit a subsequent displacement output to the rear wheel turning mechanism. The structures and operating mechanisms of central transmission devices can be categorized into a swinging arm type (as disclosed in U.S. Pat. No. 4,572,316 and U.S. Pat. No. 5,341,294), a lever linkage type (as disclosed in U.S. Pat. No. 4,105,086), a cam types (as disclosed in U.S. Pat. No. 4,957,183), a gear type (as disclosed in U.S. Pat. No. 5,307,891), and other types (as disclosed in U.S. Pat. No. 5,667,032). However, all the foregoing types of central transmission devices suffer from the drawbacks of a complicated structure, a complex assembly, a large size, poor transmission reliability, difficulty in coupling with the present vehicle structures, etc. Accordingly, improvements may be made to the conventional four wheel steering system.

SUMMARY OF THE INVENTION

Therefore, the object of the present invention is to provide a central transmission device for a four-wheel steering system that has a simple structure, easy assembly, small size, high reliability, and high adaptability.

According to the present invention, a central transmission device of a four-wheel steering system is connected between a front wheel turning mechanism and a rear wheel turning mechanism for moving the rear wheel turning mechanism in response to turning movements of the front wheel turning mechanism. The central transmission device comprises a housing, a turning output unit and a turning input unit. The housing is adapted to be disposed between the front and rear turning mechanisms and has front and rear walls.

The turning output unit includes an output shaft that extends rotatably through the rear wall and that has a rear end adapted for connection with the rear wheel turning mechanism, and a rotary disc that is coaxial and integral with a front end of the output shaft within the housing. The rotary disc includes a radially extending slide groove that has an inner end proximate to a center of the rotary disc and an outer end proximate to a circumference of the rotary disc.

The turning input unit includes an input shaft that extends rotatably through the front wall and that has a front end adapted for connection with the front wheel turning mechanism, and a cam protrusion that is disposed eccentrically at a rear end of the input shaft within the housing. The input shaft has an axis of rotation parallel to and offset from that of the output shaft. The cam protrusion extends slidably into the slide groove to turn the rotary disc within a limited angle.

When the turning input unit is not rotated by the front wheel turning mechanism, the cam protrusion is located at the inner end of the slide groove.

When the turning input unit is rotated by the front wheel turning mechanism, the cam protrusion slides to an intermediate position between the inner and outer ends of the slide groove to rotate the rotary disc in a direction opposite to that of the input shaft, and then to the outer end of the slide groove to rotate the rotary disc in the same direction as the input shaft, and thereafter moves back to the intermediate position to rotate the rotary disc in the same direction as the input shaft.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
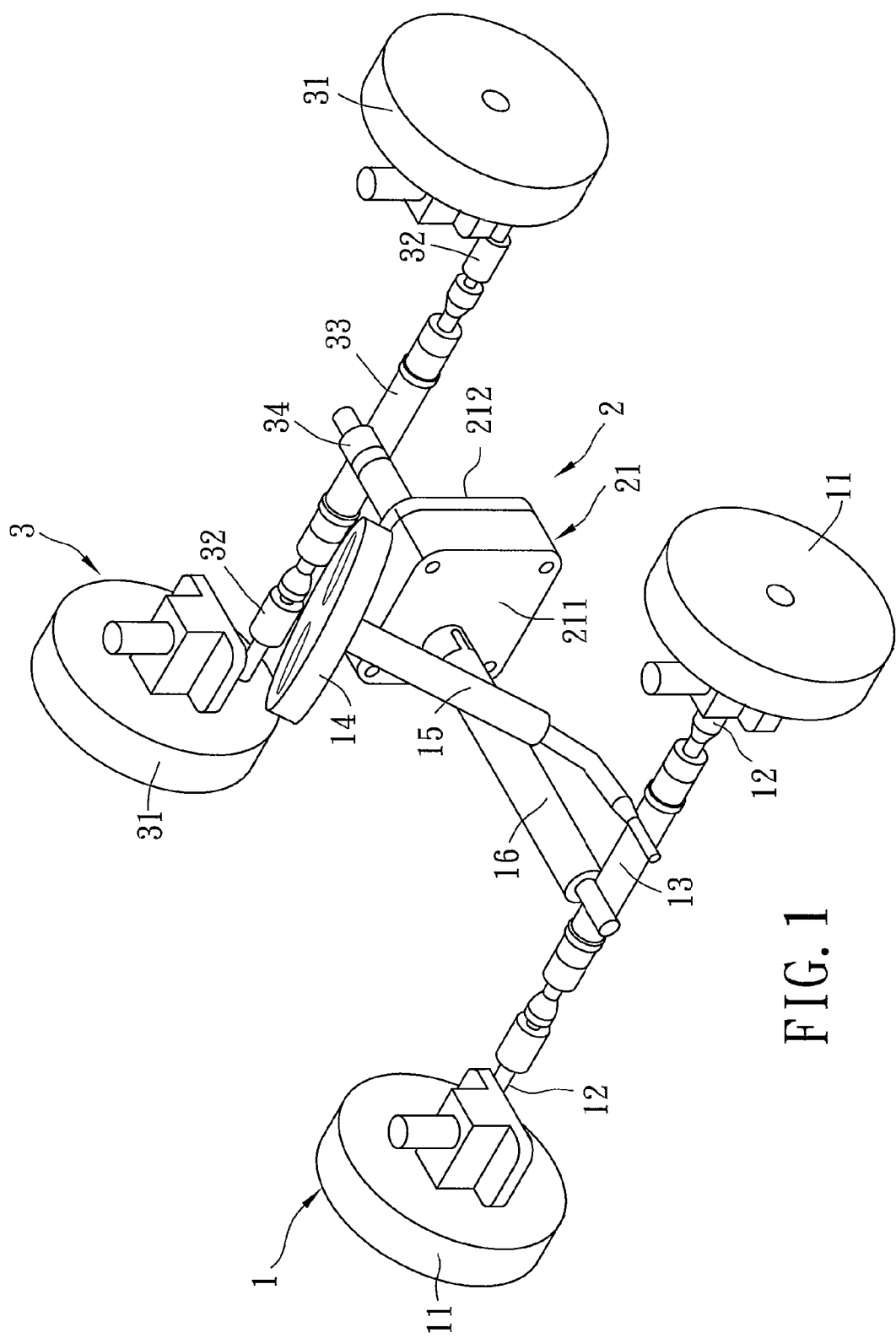
FIG. 1 is a perspective view showing a four-wheel steering system incorporating a central transmission device according to the present invention.
Figure 2:
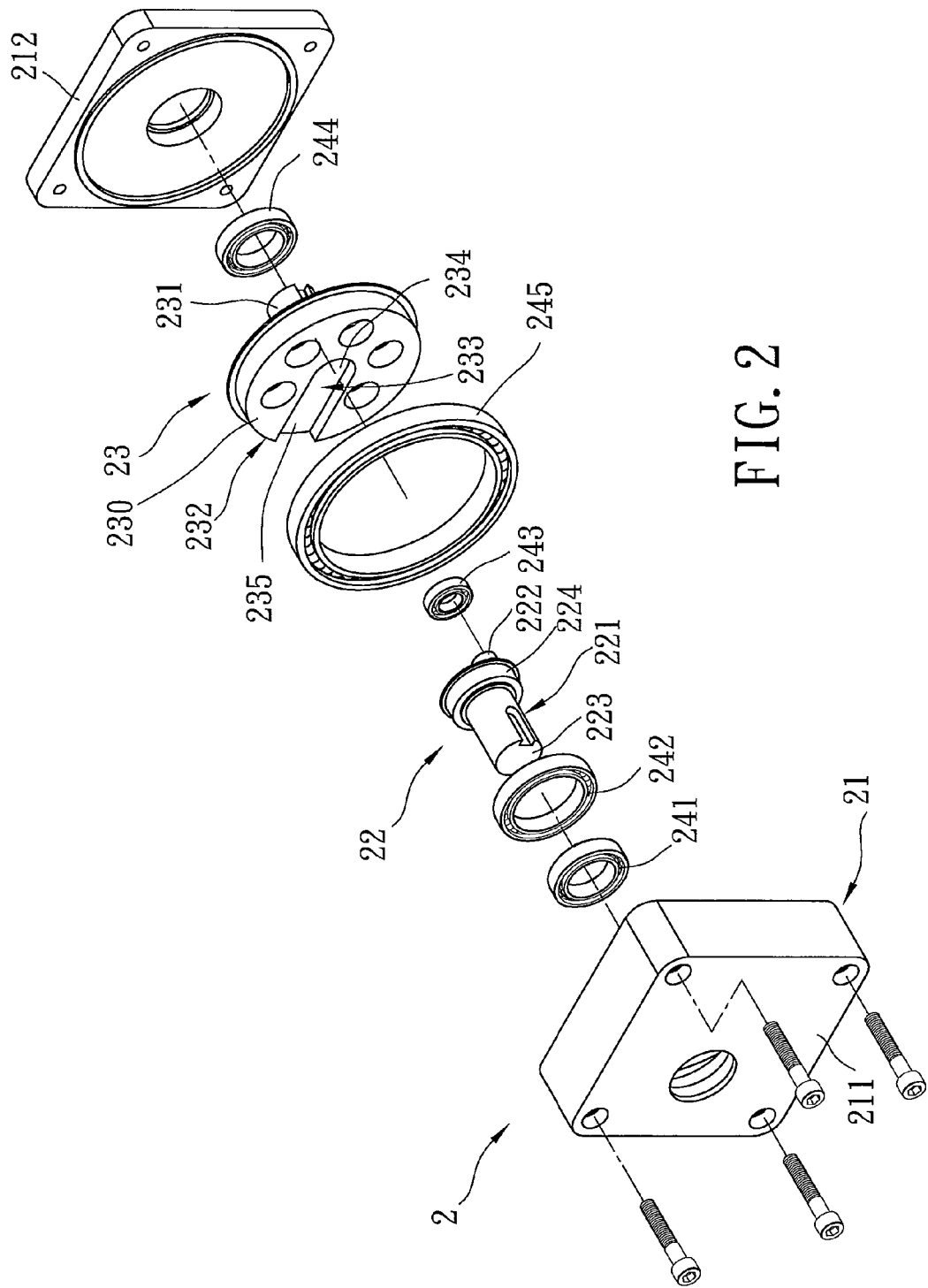
FIG. 2 is an exploded perspective view of the central transmission device having a turning input unit to drive a turning output unit.
Figure 3:
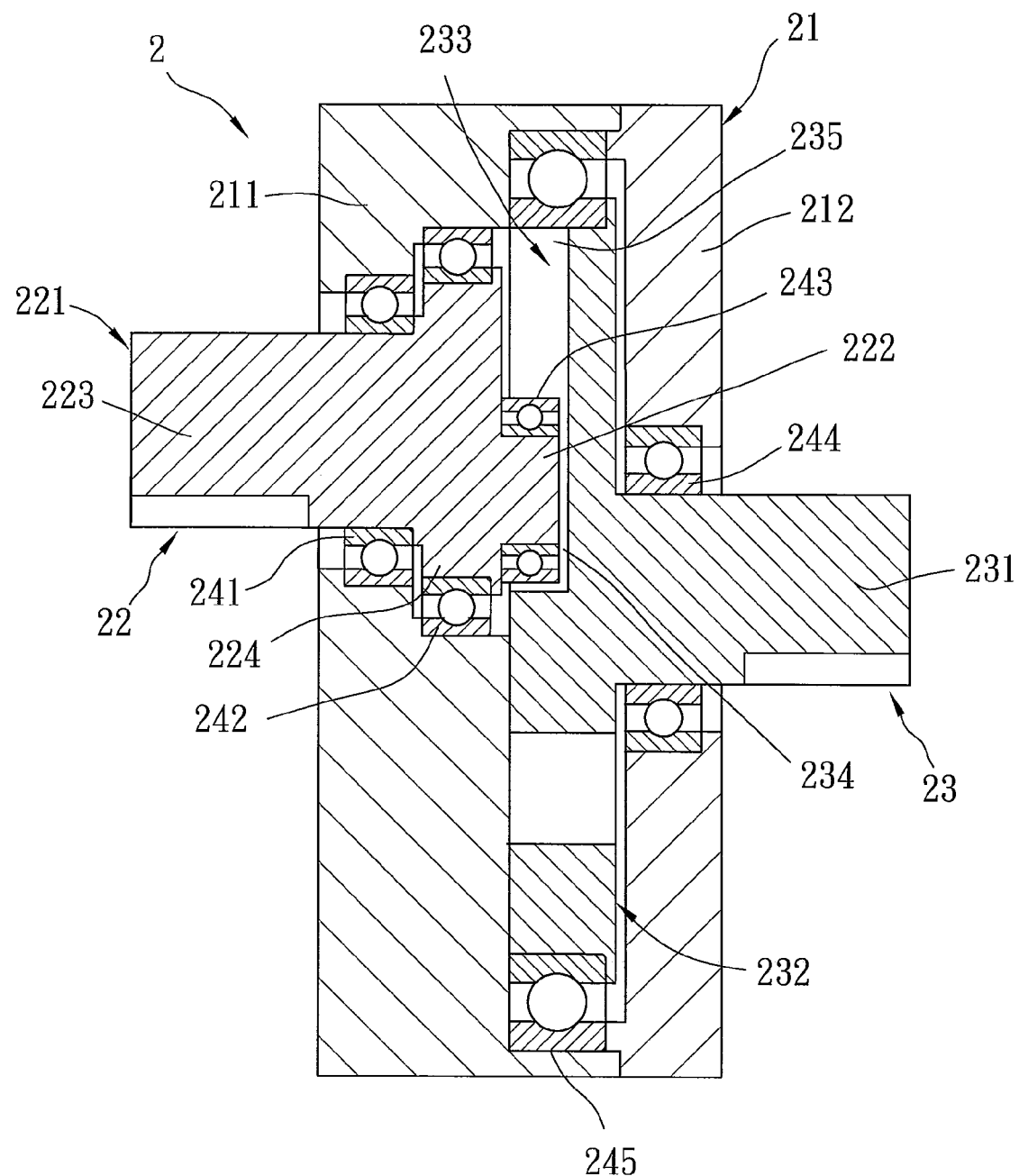
FIG. 3 is a sectional view of the central transmission device.

Referring to FIGS. 1 to 3, a central transmission device 2 for a four-wheel steering system according to a preferred embodiment of the present invention is connected between a front wheel turning mechanism 1 and a rear wheel turning mechanism 3 of a vehicle. The front wheel turning mechanism 1 includes a pair of front wheels 11, a pair of front wheel turning arms 12 each of which is connected pivotably to one of the front wheel 11, a front pulling rod 13 connected movably between the front wheel turning arms 12 to displace leftward and rightward, a steering wheel 14, a turning post 15 that has a front end connected to the front pulling rod 13 and a rear end connected to the steering wheel 14 and that is rotatable leftward and rightward, and a front wheel displacement axle 16 that has a front end connected to the front pulling rod 13 and a rear end connected to the central transmission device 2 and that is rotatable leftward and rightward.

The rear wheel turning mechanism 3 includes a pair of rear wheels 31, a pair of rear wheel turning arms 32, each of which is connected pivotably to one of the rear wheels 31, a rear pulling rod 33 connected movably between the rear wheel turning arms 32 and rotatable leftward and rightward, and a rear wheel displacement axle 34 that has a rear end connected to the rear pulling rod 33 and a front end connected to the central transmission device 2 and that is rotatable leftward and rightward.

The central transmission device 2 includes a rectangular housing 21 connected between the front wheel displacement axle 16 and the rear wheel displacement axle 34. The central transmission device 2 includes a front wall 211, a rear wall 212, a turning input unit 22 connected to a rear end portion of the front wheel displacement axle 16 and extending rotatably through the front wall 211 of the housing 21, and a turning output unit 23 connected to a front end portion of the rear wheel displacement axle 34 and extending rotatably through the rear wall 212 of the housing 21.

The turning output unit 23 includes an output shaft 231 that extends rotatably through the rear wall 212 and that has a rear end connected coaxially with the front end portion of the rear wheel displacement axle 34 of the rear wheel turning mechanism 3, and a rotary disc 232 that is coaxial and integral with a front end of the output shaft 231 within the housing 21. The rotary disc 232 has a front end face 230 formed with a radially extending slide groove 233 that has an inner end 234 proximate to a center of the rotary disc 232 and an outer end 235 proximate to a circumference of the rotary disc 232.

The turning input unit 22 includes an input shaft 221 that extends rotatably through the front wall 211 and that has a front end connected to a rear end portion of the front wheel displacement axle 16 of the front wheel turning mechanism 1, and a cam protrusion 222 that is disposed eccentrically at a rear end of the input shaft 221 within the housing 21. The input shaft 221 has an input shaft body 223 extending outwardly from the housing 21, and an enlarged disk portion 224 connected integrally and coaxially to the input shaft body 223 within the housing 21.

The axis of rotation of the input shaft 221 is parallel to and offset from that of the output shaft 231. The rear end face of the enlarged disk portion 224 of the input shaft 221 confronts the front end face 230 of the rotary disc 232 of the output shaft 231. The cam protrusion 222 projects axially, rearwardly and eccentrically from the rear end face of the enlarged disk portion 224, and extends slidably into the slide groove 233 of the rotary disc 232 to turn the rotary disc 232 within a limited angle. The rotary disc 232 of the output shaft 231 has a diameter larger than that of the enlarged disk portion 224 of the input shaft 221. In this embodiment, the diameter of the rotary disc 232 is twice of that of the enlarged disk portion 224.

The turning input unit 22 further includes a first bearing assembly 241 disposed between the input shaft body 223 and the front wall 211, and a second bearing assembly 242 disposed between the enlarged disk portion 224 and the front wall 211. The first and second bearing assemblies 241, 242 are arranged coaxially. In addition, the turning input unit 22 further includes a third bearing assembly 243 disposed around the cam protrusion 222 and within the slide groove 233.

The turning output unit 23 further includes a fourth bearing assembly 244 disposed between the output shaft 231 and the rear wall 212, and a fifth bearing assembly 245 disposed between the rotary disc 232 and the rear wall 212. The fourth and fifth bearing assemblies 244, 245 are arranged coaxially. The disposition of the bearing assembles 241~245 enables smooth rotation of the turning input unit 22 and the turning output unit 23 relative to the housing 21.

The operations of the entire four-wheel steering system, and the relative movements of the central transmission device 2, the front wheel turning mechanism 1 and the rear wheel turning mechanism 3 are described hereinafter.

Figure 4:
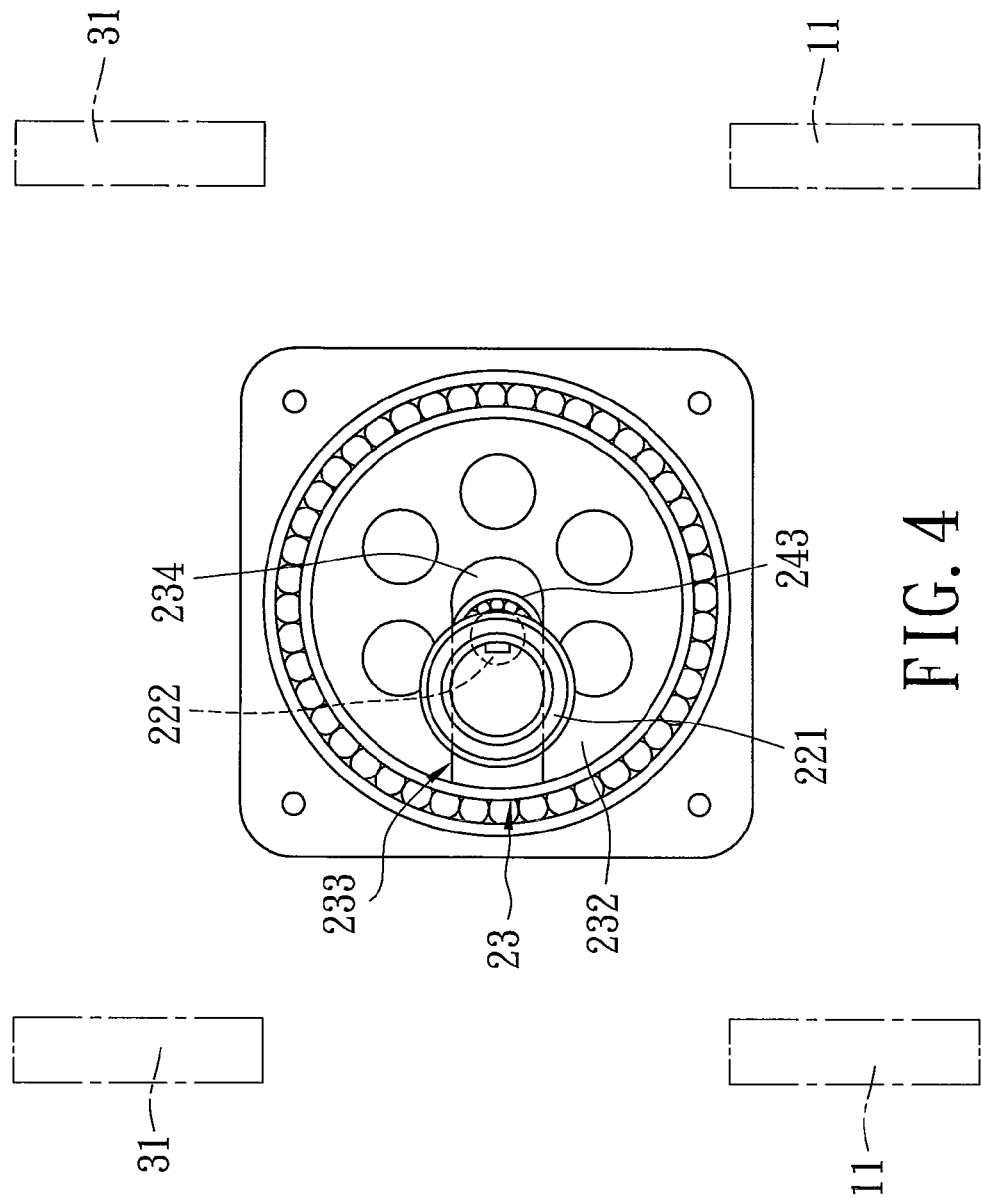
FIG. 4 is a schematic view illustrating front and rear wheels that are aligned in the straight forward direction, and a cam protrusion of the turning input unit that is situated in proximity to an inner end of a slide groove of the turning output unit.

Referring to FIGS. 1 and 4, when the vehicle is driven in a straight forward direction, the two front wheels 11 and the two rear wheels 31 are aligned in the straight front direction. As the steering wheel 14 is not turned, the input and output shaft 221, 231 do not rotate. At this state, the slide groove 233 of the rotary disc 232 is horizontal, and the cam protrusion 222 and the third bearing assembly 243 are proximate to the inner end 234 of the slide groove 233.

Figure 5:
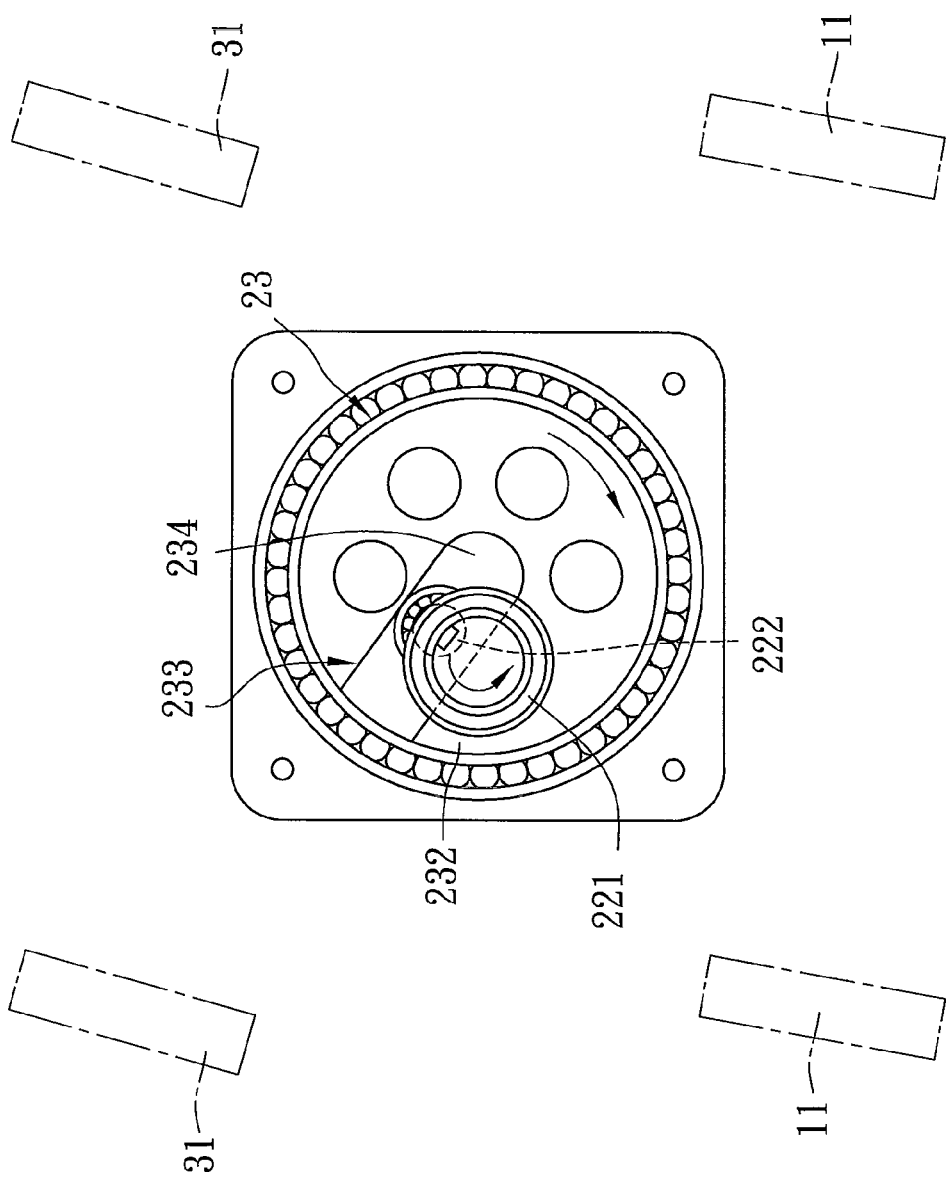
FIG. 5 illustrates that the cam protrusion slides to an intermediate position (first position) within the slide groove so that the turning output unit drives rotation of the turning output unit in an opposite direction and that the front and rear wheels turn in the same direction.

Referring to FIGS. 1 and 5, when the vehicle is to make a small amount of right turn (refer to the rightward direction viewed from FIG. 1), the steering wheel 14 is turned right to rotate the turning post 15 so that the front pulling rod 13 is moved leftward. At this moment, the front pulling rod 13 pulls the two front wheel turning arms 12 to turn the two front wheels 11, and at the same time rotates the front wheel displacement axle 16. Accordingly, the input shaft 221 is rotated in the same direction (counterclockwise in FIG. 5) as the front wheel displacement axle 16 so that the cam protrusion 222 is moved from the inner end 234 of the slide groove 233 to an intermediate position of the slide groove 233 between inner and outer ends 234, 235 of the slide groove 233. As a result, the slide groove 233 is turned upward an angle (in this embodiment, the angle is 37.3°), and the rotary disc 232 is rotated in an opposite direction. The turning output unit 23 is therefore driven by the turning input unit 22 to turn in the opposite direction. As the rear wheel displacement axle 34 is driven by the turning output unit 23, the rear pulling rod 33 is moved rightward and pulls the two rear turning arms 32 so that the two rear wheels 31 turn right. Hence, when the two front wheels 11 make a small amount of right turn, the two rear wheels 31 also turn right. The turning directions of the front and rear wheels 11, 31 are the same.

Figure 6:
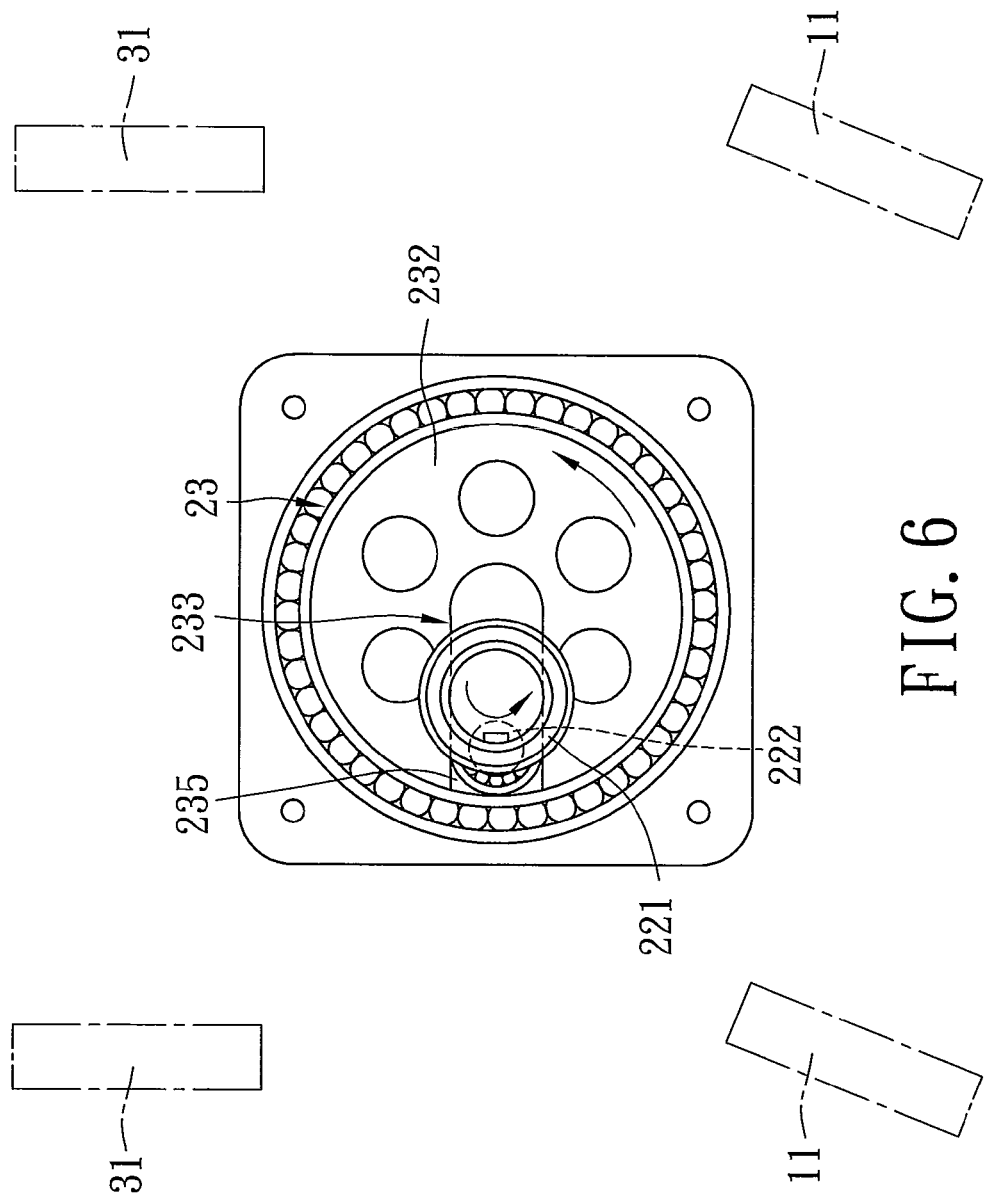
FIG. 6 illustrates that the cam protrusion slides to an outer end of the slide groove (second position) within the slide groove so that the rear wheels are turned back and are aligned in the straight forward direction.

Referring to FIGS. 1 and 6, when the vehicle is to make a medium amount of right turn, a further amount of rightward rotation is input to the turning input unit 22 through the front wheel turning mechanism 1 so that the cam protrusion 222 slides from the intermediate position to the outer end 235 of the slide groove 233. During the movement of the cam protrusion 222 from the intermediate position to the outer end 235 of the slide groove 233, the rotary disc 232 is turned in the same direction as the input shaft 221 so that the rotary disc 232 is moved from the position shown in FIG. 5 back to the position shown in FIG. 6. In other words, the slide groove 233 is turned downward to a horizontal state. Accordingly, the rear wheel displacement axle 34 rotates in the same direction as the turning output unit 23, and moves back the rear pulling rod 33 in a leftward direction. The rear pulling rod 33 in turn pulls the two rear turning arms 32, thereby turning the two rear wheels 31 leftward and aligning back the same with the straight forward direction. Therefore, when the two front wheels 11 make a medium amount of right turn, the two rear wheels 31 are aligned with the straight forward direction.

Figure 7:
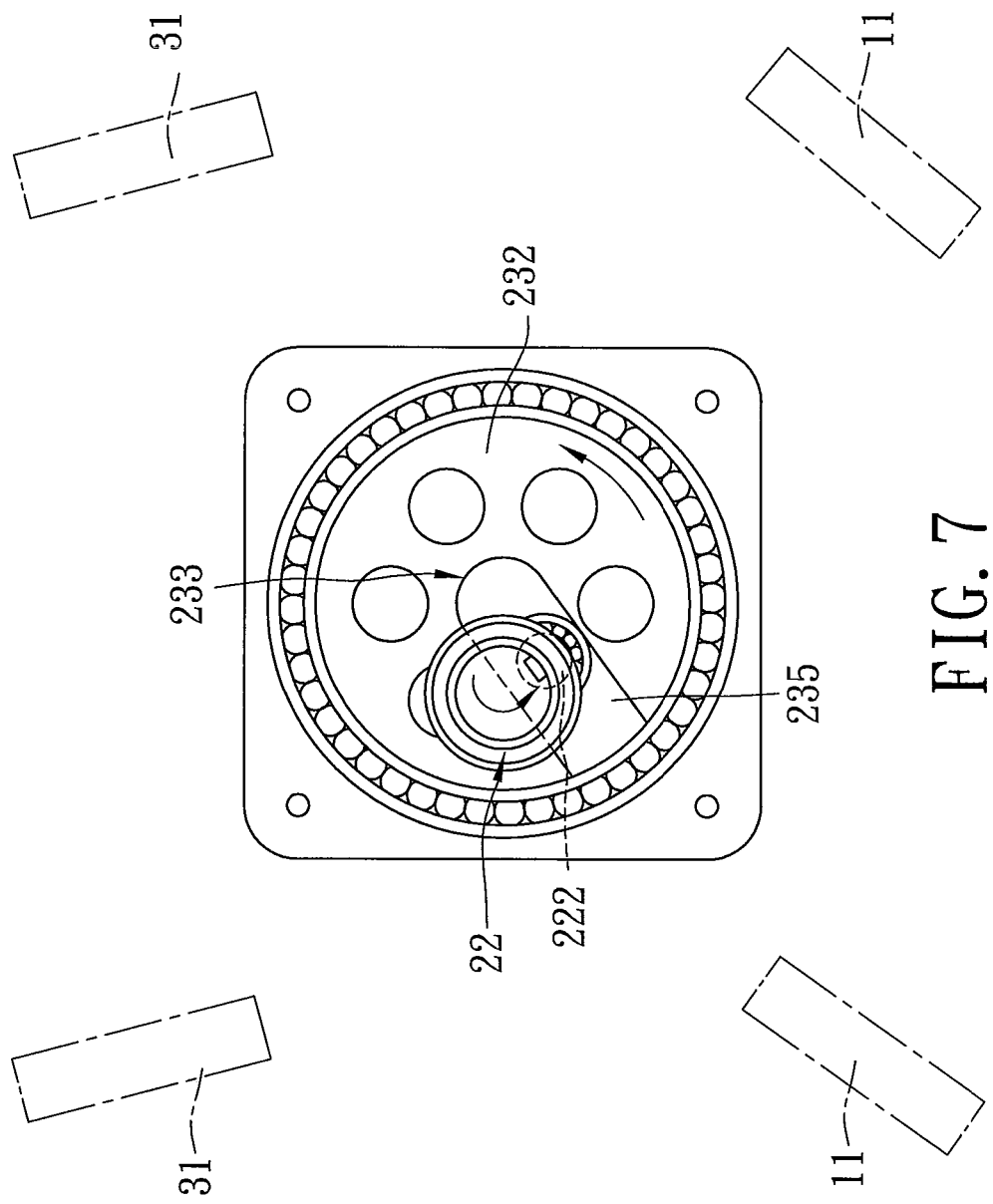
FIG. 7 illustrates that the cam protrusion slides back to the intermediate position in the slide groove so that the rear wheels are turned in a direction opposite to that of the front wheels.

Referring to FIGS. 1 and 7, when the vehicle is to make a large amount of right turn, an additional amount of rightward rotation is input to the turning input unit 22 through the front wheel turning mechanism 1 so that the cam protrusion 222 moves from the outer end 235 of the slide groove 233 to the intermediate position as shown in FIG. 7. During the movement of the cam protrusion 222 from the outer end 235 of the slide groove 233 to the intermediate point of the slide groove 233, the cam protrusion 222 drives the rotary disc 232 to rotate in the same direction as the input shaft 221 so that the rotary disc 232 is turned downward from the horizontal position shown in FIG. 6 for an angle (in an embodiment, the angle is 37.3°). At the same time, the rear wheel displacement axle 34 moves the rear pulling rod 33 leftward, thereby turning the rear wheels 13 leftward. Therefore, when the front wheels 11 are angled far enough, the front and rear wheels 11, 31 turn in opposite directions.

Furthermore, when the turning angle of the front wheels of the vehicle approaches 90 degrees, the angle of rotation of the turning input unit 22 is about 360 degrees so that the cam protrusion 222 slides back to the inner end 234 of the slide groove 233, and rotates the rotary disc 232 in the opposite direction relative to the turning input unit 22, so that the slide groove 233 of the rotary disc 232 is turned upwardly from the position shown in FIG. 7 to the horizontal state as shown in FIG. 4. In the mean time, the turning output unit 23 drives the rear wheel displacement axle 34 so that the two rear wheels 31 turn rightward and are aligned again with the straight direction.

Therefore, when the cam protrusion rotates one revolution (360°), the rotary disc 232 rotates reciprocally within a limited angle of less than 360 degrees. In an embodiment, the rotary disc 232 rotates about 74.6 degrees.

The central transmission device 2 has a simple construction and is easy to assemble. Because the turning input and output units 22, 23 of the central transmission device 2 can be connected directly and coaxially to and are co-rotatable with the existing front and rear wheel displacement axles 16, 34, the central transmission device 2 is relatively compatible with existing front and rear wheel turning mechanisms. The central transmission device 2 can be installed easily in an existing four wheel steering system.

While the present invention has been described in connection with what are considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A central transmission device of a four-wheel steering system, which is connected between a front wheel turning mechanism and a rear wheel turning mechanism for moving the rear wheel turning mechanism in response to turning movements of the front wheel turning mechanism, the central transmission device comprising:

a housing adapted to be disposed between said front and rear turning mechanisms and having front and rear walls;

a turning output unit including an output shaft that extends rotatably through said rear wall and that has a rear end adapted for connection with the rear wheel turning mechanism, and a rotary disc that is coaxial and integral with a front end of said output shaft within said housing, said rotary disc including a radially extending slide groove that has an inner end proximate to a center of said rotary disc and an outer end proximate to a circumference of said rotary disc; and a turning input unit including an input shaft that extends rotatably through said front wall and that has a front end adapted for connection with the front wheel turning mechanism, and a cam protrusion that is disposed eccentrically at a rear end of said input shaft within said housing, said input shaft having an axis of rotation parallel to and offset from that of said output shaft, said cam protrusion extending slidably into said slide groove to turn said rotary disc within a limited angle;

wherein, when said input shaft is not rotated by the front wheel turning mechanism, said cam protrusion is located at said inner end of said slide groove; and wherein, when said turning input unit is rotated by the front wheel turning mechanism, said cam protrusion slides to an intermediate position between said inner and outer ends of said slide groove to rotate said rotary disc in a direction opposite to that of said input shaft, and then to said outer end of said slide groove to rotate said rotary disc in the same direction as said input shaft, and thereafter moves back to said intermediate position to rotate said rotary disc in the same direction.

2. The central transmission device of claim 1, wherein said rotary disc rotates reciprocally within a limited angle when the cam protrusion rotates one revolution.

3. The central transmission device of claim 1, wherein said input shaft has an input shaft body extending outwardly from said housing, and an enlarged disk portion connected integrally and coaxially to said input shaft body within said housing, said enlarged disk portion having a rear end face confronting said rotary disc, said cam protrusion projecting axially, rearwardly and eccentrically from said rear end face of said enlarged disk portion.

4. The central transmission device of claim 3, wherein said turning input unit further includes a first bearing assembly disposed between said input shaft body and said front wall, and a second bearing assembly disposed between said enlarged disk portion and said front wall, said first and second bearing assemblies being arranged coaxially.

5. The central transmission device of claim 4, wherein said turning input unit further includes a third bearing assembly disposed around said cam protrusion and within said slide groove.

6. The central transmission device of claim 1, wherein said turning output unit further includes a fourth bearing assembly disposed between said output shaft and said rear wall, and a fifth bearing assembly disposed between said rotary disc and said rear wall, said fourth and fifth bearing assemblies being arranged coaxially.

* * * * *